US008548756B1

(12) United States Patent
Foley

(10) Patent No.: US 8,548,756 B1
(45) Date of Patent: *Oct. 1, 2013

(54) SYSTEM FOR CALCULATING MAXIMUM ALLOWABLE OPERATING PRESSURE AND MAXIMUM OPERATING PRESSURE OF A PIPELINE

(71) Applicant: RCP Inc., Houston, TX (US)

(72) Inventor: Christopher Brian Foley, Houston, TX (US)

(73) Assignee: RCP Inc., Houston, TX (US)

( * ) Notice: Subject to any disclaimer, the term of this patent is extended or adjusted under 35 U.S.C. 154(b) by 2295 days.

This patent is subject to a terminal disclaimer.

(21) Appl. No.: 13/741,247

(22) Filed: Jan. 14, 2013

(51) Int. Cl.
*G01F 1/28* (2006.01)

(52) U.S. Cl.
USPC .............. 702/50; 702/33; 702/34; 702/35

(58) Field of Classification Search
USPC ............. 702/33–35, 47, 50, 51; 700/28, 700/32, 46; 705/412, 413; 137/1, 2, 12, 137/13, 486, 488; 73/700, 861.01, 861.04, 73/861.71
See application file for complete search history.

(56) References Cited

U.S. PATENT DOCUMENTS

| | | | |
|---|---|---|---|
| 4,707,797 A | 11/1987 | Briggs | |
| 7,366,621 B2 | 4/2008 | Sprague | |
| 7,414,395 B2 | 8/2008 | Gao et al. | |
| 7,426,942 B2 * | 9/2008 | Rice | 138/99 |
| 7,643,974 B2 | 1/2010 | Harper et al. | |
| 7,647,136 B2 | 1/2010 | McDowell | |
| 7,668,688 B2 | 2/2010 | Najim Al-Khamis | |
| 7,835,893 B2 | 11/2010 | Cullick et al. | |
| 7,860,669 B2 | 12/2010 | Najim Al-Khamis | |
| 7,895,052 B1 | 2/2011 | Theriot et al. | |
| 7,895,134 B2 | 2/2011 | Theriot et al. | |
| 7,936,259 B1 | 5/2011 | Weibel et al. | |
| 7,983,853 B2 | 7/2011 | Wang et al. | |
| 8,073,637 B2 | 12/2011 | Cline et al. | |
| 8,155,893 B2 | 4/2012 | Cline et al. | |
| 2006/0065320 A1 * | 3/2006 | Borland et al. | 138/99 |
| 2009/0193899 A1 * | 8/2009 | Panetta et al. | 73/622 |
| 2010/0222911 A1 * | 9/2010 | Castelijns et al. | 700/104 |
| 2011/0137704 A1 * | 6/2011 | Mitra et al. | 705/7.28 |

OTHER PUBLICATIONS

Nemec, Richard, "PG&E's Pipeline System: From Hell and Back". Pipeline & Gas Journal. Apr. 2013, vol. 240; No. 4.

* cited by examiner

*Primary Examiner* — Sujoy Kundu
(74) *Attorney, Agent, or Firm* — Buskop Law Group, PC; Wendy Buskop

(57) ABSTRACT

A system for providing traceable, verifiable complete MAOP or MOP information for a specific pipeline to users in an automated manner that is viewable continuously via a network. The system comprises a processor in communication with the network; a data storage in communication with the processor. The data storage includes computer instructions for identifying a specific pipeline, providing a unique identifier for the specific pipeline, collecting authenticated pipeline segment information related to the specific pipeline, collecting non-authenticated pipeline segment information related to the specific pipeline, automatically identifying gaps in MAOP or MOP data, automatically identifying gaps in user established MAOP or MOP; automatically filling the gaps in MAOP or MOP data, calculating MAOP or MOP for the specific pipeline, and showing valid and invalid MAOP or MOP to a user using an executive dashboard.

16 Claims, 8 Drawing Sheets

FIGURE 2

| | |
|---|---|
| OBTAINING AN IDENTIFIER FOR A SPECIFIC PIPELINE SEGMENT | 200 |
| COLLECTING AUTHENTICATED PIPELINE SEGMENT INFORMATION | 202 |
| COLLECTING NON-AUTHENTICATED PIPELINE SEGMENT INFORMATION | 204 |
| PERFORMING "DYNAMIC SEGMENTATION" | 206 |
| SORTING THE COLLECTED RECORDS | 207 |
| PERFORMING SMART SEGMENTATION ON THE DYNAMIC SEGMENTED DATA SET FORMING A CALCULATOR INPUT SET | 208 |
| FILLING IN THE CALCULATOR INPUT SET FORMING A RESULTING CALCULATOR INPUT SET | 210 |
| CALCULATING RECORD BY RECORD MAOP OR MOP FORMING A MAOP OR MOP OUTPUT SET | 212 |
| DISPLAYING VALID AND INVALID MAOP OR MOP CALCULATIONS ON AN EXECUTIVE DASHBOARD | 214 |
| DEPICTING A LINEAR REFERENCE PROFILE ON THE EXECUTIVE DASHBOARD | 215 |
| CREATING MULTIPLE USER ACCOUNTS PER PIPELINE OPERATOR | 220 |
| USING MULTIPLE FORMATS OF AUTHENTICATED AND NON-AUTHENTICATED DATA WITH EACH COLLECTING STEP OF AUTHENTICATED AND NON-AUTHENTICATED DATA | 222 |
| USING AN ENCRYPTION MODULE CONTROLLING ACCESS TO THE MAOP OR MOP OUTPUT SET | 224 |
| MAINTAINING THE PIPELINE INFORMATION IN A CLOUD BASED SERVER | 226 |
| CREATING AN AUDITABLE TRACE BETWEEN AUTHENTICATED MAOP OR MOP INPUT DATA AND THE SOURCE DOCUMENTS USING A UNIQUE IDENTIFIER | 228 |
| PROVIDING GOVERNMENT REGULATORY CITATIONS THAT WERE USED TO FORM THE MAOP OR MOP OUTPUT SET | 230 |
| PROVIDING A REPORT OR ALARM TO A USER OF A MAJOR DISCREPANCY WITH MAOP OR MOP OUTPUT SET COMPARED TO A PIPELINE OPERATOR ESTABLISHED MAOP OR MOP | 232 |
| PROVIDING THE MAOP OR MOP OUTSET SET TO THE EXECUTIVE DASHBOARD TO DETERMINE IF A PIPELINE IS CAPABLE OF A HIGHER OPERATING PRESSURE RATING THAN CURRENTLY BEEN ESTABLISHED | 234 |

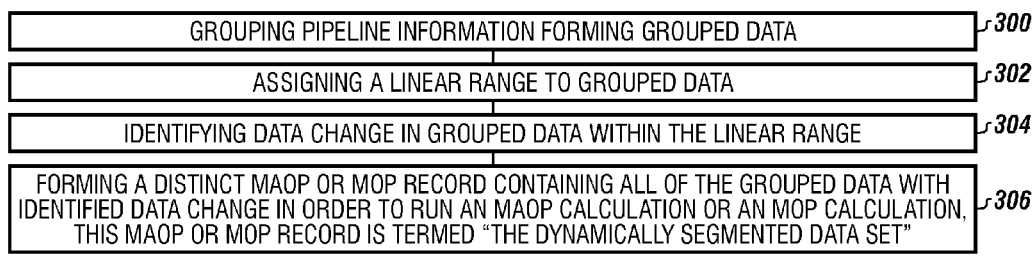
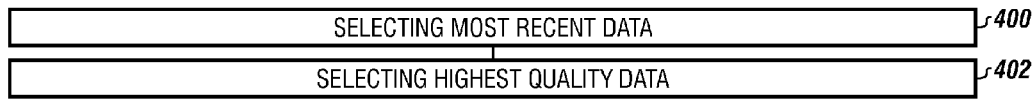

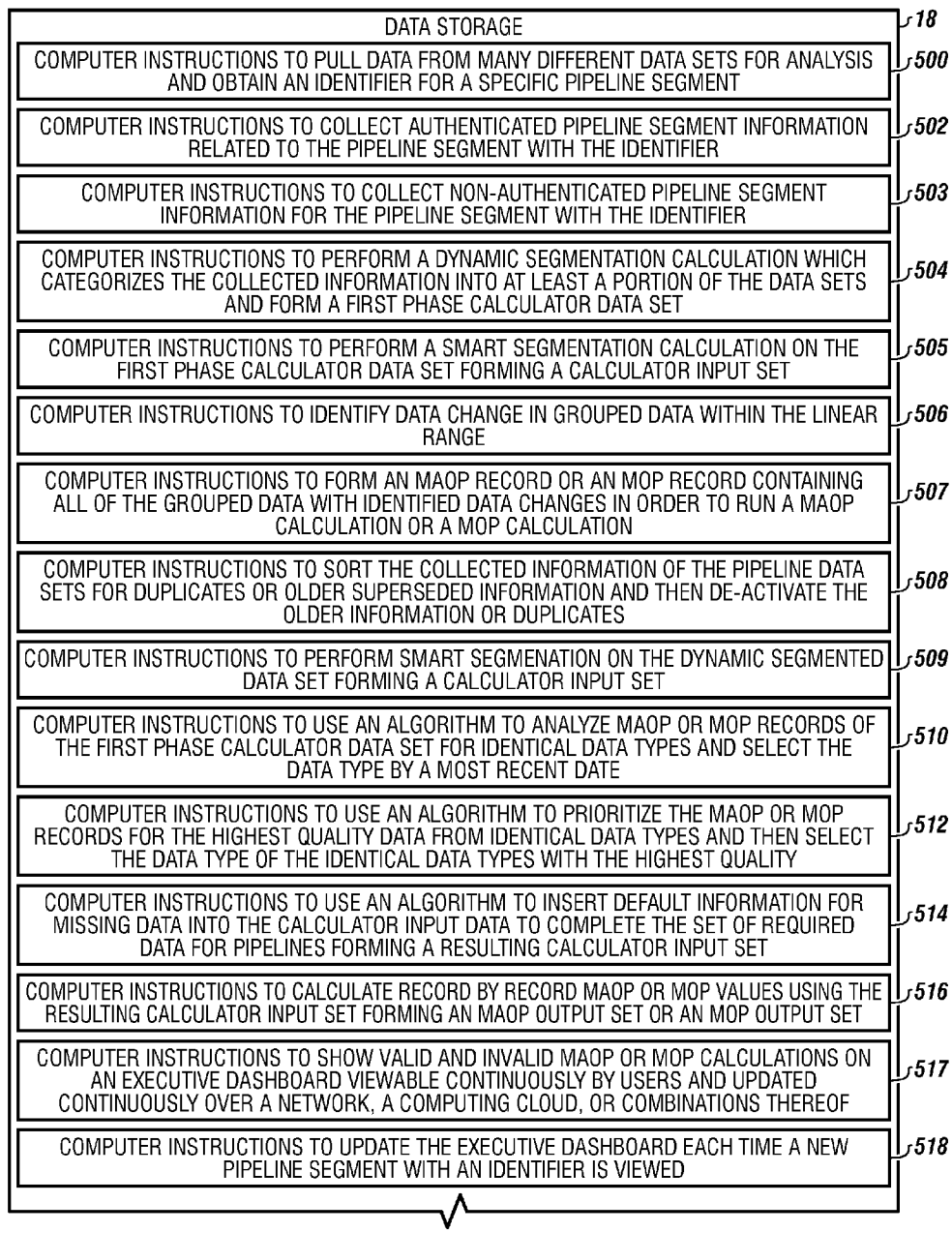

FIGURE 7

| | | | |
|---|---|---|---|
| 700 | LINE LOCATION / STATIONING | | DATA QUALITY GRADE | |
| | | | JURISDICTION | |
| | | | ASSET TYPE | |
| | | | LINE | |
| | | | ROUTE | |
| | | BEGINNING | SERIES | |
| | | | STATION | |
| | | | MILEPOST | |
| | | | PLUS FOOTAGE | |
| | | | MEASURE | |
| | | | ELEVATION | |
| | | ENDING | SERIES | |
| | | | STATION | |
| | | | MILEPOST | |
| | | | PLUS FOOTAGE | |
| | | | MEASURE | |
| | | | ELEVATION | |
| 702 | CLASS LOCATION | | CLASS DETERMINATION DATE | |
| | | | CLASS CHANGE UNDER 192.611 | |
| | | | OPERATED AS CLASS 2,3 OR 4 SINCE BEFORE GRANDFATHERED DATE | |
| | | | WAIVER ALTERNATIVE MAOP? | |
| | | | PREVIOUS CLASS | |
| | | | CURRENT CLASS | |
| 704 | CONVERTED OR UPRATED | | CONVERTED FROM OTHER SERVICE? | |
| | | | UPRATE PRESSURE | |
| | | | UPRATED? | |
| 706 | OCCUPIED BUILDING WITHIN 300FT | | | |
| 708 | MAXIMUM OPERATING TEMPERATURE - °F | | | |
| 710 | HIGHEST DOCUMENTED TEST OR OPERATING PRESSURE (FIVE YEAR CODE GRANDFATHER PERIOD) | | | |
| 712 | HYDROSTATIC TESTS | | PRESSURE WHEN TESTED TO YIELD (192.619(a)(1)(i)) | |
| | | 192 OR 195 COMPLIANT | TEST LENGTH (HOURS) | |
| | | | WAS TEST POST-INSTALLATION? | |
| | | | TEST DATE | |
| | | | TEST PRESSURE | |
| | | | ELEVATION OF TEST POINT | |
| 714 | PIPE | 780 | DATE INSTALLED | |
| | | 781 | DATE OF MANUFACTURE | |
| | | 782 | ROAD CROSSINGS | ROAD TYPE |
| | | | | ROAD INSTALL DATE |
| | | | | ROAD DESCRIPTION |
| | | | | CASING |
| | | 783 | FABRICATED ASSEMBLY | |
| | | 784 | COMPRESSION, REGULATION, MEASURING STATION | |
| | | 785 | IS PIPE COLD EXPANDED AND RE-HEATED? | |
| | | 786 | MATERIAL | |
| | | 787 | O.D. | |
| | | 788 | W.T. | |
| | | 789 | SEAM TYPE / MANUFACTURING PROCESS 192.113 | |
| | | 790 | GRADE | |
| 716 | REPAIR SLEEVES | | DATE INSTALLED | |
| | | | DATE OF MANUFACTURE | |
| | | | FABRICATED ASSEMBLY | |
| | | | COMPONENT PRESSURE RATING | |
| | | | IS PIPE COLD EXPANDED AND RE-HEATED | |
| | | | MATERIAL | |
| | | | O.D. | |
| | | | W.T. | |
| | | | SEAM TYPE / MANUFACTURING PROCESS 192.113 | |
| | | | GRADE | |
| 718 | ESTABLISHED MAOP (192.611(b) & 192.555(b)) | | | |
| 720 | MAXIMUM OPERATING PRESSURE | | MAOP | |
| | | | MAOP DISTRICT | |
| 722 | OPERATOR DETERMINED MAOP OVERRIDE | | OVERRIDE CALCULATED MAOP? | |
| | | | OVERRIDE DATE | |
| | | | MAOP PRESSURE | |

SYSTEM FOR CALCULATING MAXIMUM ALLOWABLE OPERATING PRESSURE AND MAXIMUM OPERATING PRESSURE OF A PIPELINE

FIELD

The present embodiments generally relate to a system for calculating the maximum allowable operating pressure and maximum operating pressure of a pipeline.

BACKGROUND

After a pipeline explosion in San Bruno, Calif. in which eight people perished and approximately fifty houses were damaged or destroyed, the National Transportation and Safety Board (NTSB) investigation and report revealed there was a need for traceable, verifiable and complete MAOP or MOP to prevent this type of accident from occurring in the future.

A need exists for a system that can both (i) calculate the MAOP and MOP pipeline information and (ii) push that calculated information to groups of users simultaneously, enabling the users to see gaps in the information, enabling users take remedial steps to validate MAOP or MOP which might prevent such accidents in the future.

A further need exists for a system to compute when gaps occur in design, construction, operation and maintenance data required for Maximum Allowable Operating Pressure (MAOP) pipeline calculations for gas and for Maximum Operating Pressure (MOP) calculations for hazardous liquids, and then identify the type of gap to a plurality of users, simultaneously.

The present embodiments meet these needs.

BRIEF DESCRIPTION OF THE DRAWINGS

The detailed description will be better understood in conjunction with the accompanying drawings as follows:

FIG. 2 is a diagram of the series of steps which the system can perform.

FIG. 3 shows the steps of the dynamic segmentation calculation performed by the system.

FIG. 4 shows the steps of the smart segmentation calculation that can be performed by the system.

FIGS. 5A-5C show computer instructions in the data storage according to one or more embodiments.

FIG. 7 is a presentation of the MAOP data fields according to one or more embodiments.

Figure 1:
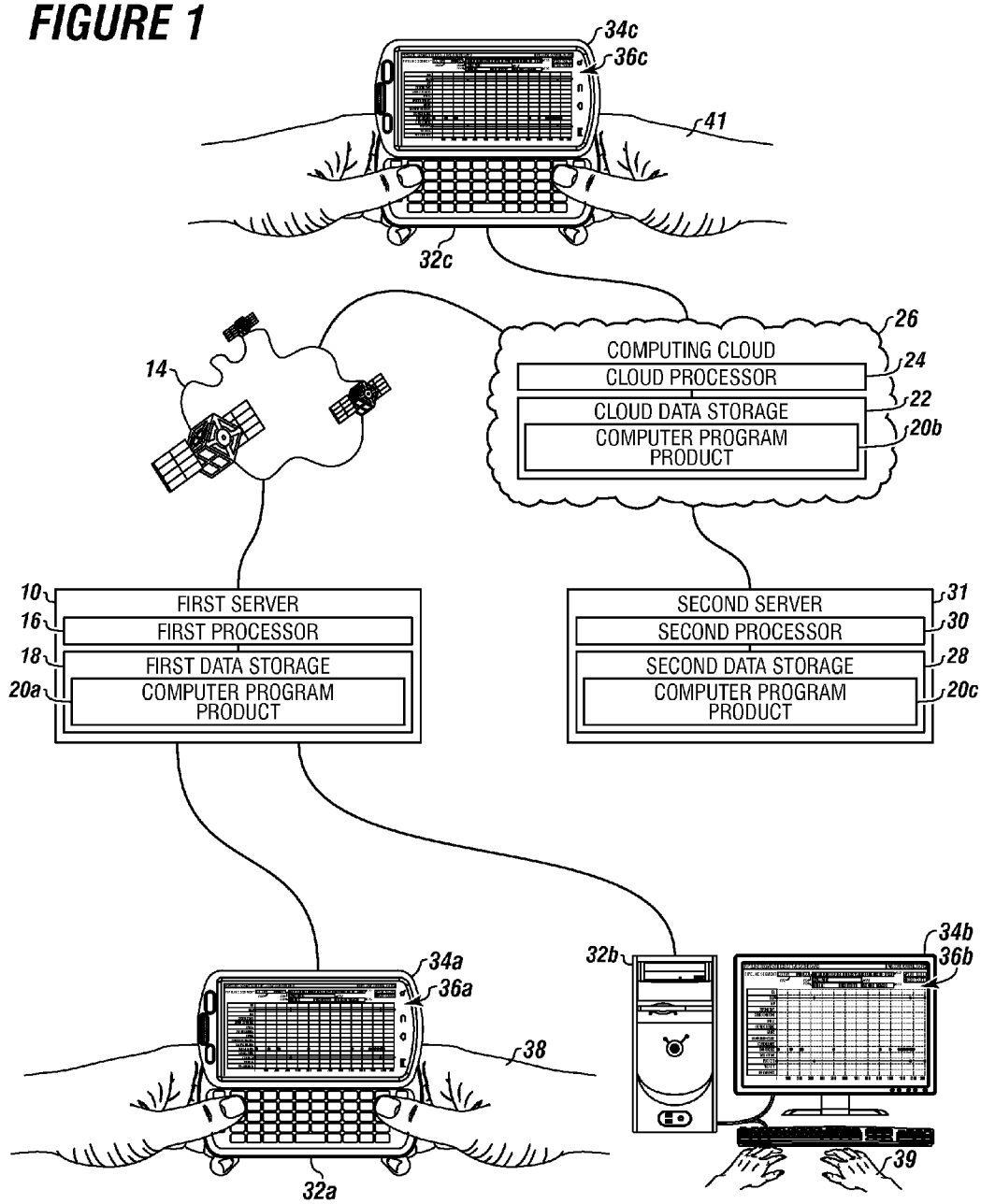
FIG. 1 is an overview of the computer processing equipment of the system.

The present embodiments are detailed below with reference to the listed Figures.

DETAILED DESCRIPTION OF THE EMBODIMENTS

Before explaining the present system in detail, it is to be understood that the system is not limited to the particular embodiments and that it can be practiced or carried out in various ways.

The present embodiments generally relate to a system for calculating the maximum allowable operating pressure and maximum operating pressure of a pipeline.

When Pacific Gas and Electric's (PG&E) pipeline ruptured with a fire in 2010, eight people died as a result, over fifty homes were destroyed or damaged.

The pipeline industry is interested in the affected public located proximate to pipelines and wants to avoid harming people who live and work around pipelines carrying hazardous liquids and gas.

It was clear after the PG&E rupture, that a need existed for a system that can identify gaps in design, construction, operation and maintenance data for Maximum Allowable Operating Pressure (MAOP) pipeline calculations for gas in pipelines and for Maximum Operating Pressure (MOP) pipeline calculations for hazardous liquids in pipelines.

The invention relates to a system for providing Maximum Allowable Operating Pressure (MAOP) information for gas pipelines and Maximum Operating Pressure (MOP) information for hazardous liquid pipelines that is accessible continuously to a user via a network allowing for graphical depiction of gaps in colors for quick response.

Poorly maintained pipelines, if they rupture, can pollute the aquifer and the drinking water of people. Poorly maintained pipelines, if they rupture, can catch fire, cause property damage, and endanger people.

In one or more embodiments, the system can use at least one server having a processor and data storage, and a plurality of computer instructions in the data storage that can communicate and/or connect to a plurality of client devices, over a network.

The present embodiments generally relate to a system that includes a plurality of computer instructions that, when executed by at least one processor, such as a computer, or a cloud based processor, causes the processor to perform operations that provide traceable, verifiable and complete Maximum Allowable Operating Pressure (MAOP) information for gas pipelines and for providing traceable, verifiable and complete Maximum Operating Pressure (MOP) information for hazardous liquid pipelines, wherein the information is accessible continuously via a network.

In one or more embodiments, the data storage can be non-transitory computer-readable medium. The non-transitory computer-readable medium can be hard drives, flash drives, disks, or the like.

The present embodiments generally relate to a computer based system to perform operations including obtaining an identifier for a specific pipeline segment owned by a pipeline owner or operator.

The system can collect authenticated pipeline segment information related to the specific pipeline segment, collect non-authenticated pipeline segment information related to the specific pipeline segment, and calculate dynamic segmentation for the specific pipeline segment.

In addition to calculating dynamic segmentation for the specific pipeline segment, the system can calculate smart segmentation for the specific pipeline segment.

The system can identify gaps in MAOP or MOP data based on the smart segmentation; filling the gaps in MAOP or MOP data with default information using information from one of a plurality of libraries with pipeline information, new authenticated information from users, new non-authenticated information, or combinations thereof.

The system can perform operations including calculating MAOP or MOP for the specific pipeline in accordance with federal laws particularly those in 49 CFR or derivatives and updates of that code, or of similar state regulations related to MAOP or MOP and show valid and invalid MAOP or MOP to a user using an executive dashboard viewable 24 hours a day, 7 days a week via a network.

The system can identify the gaps in MAOP data or MOP data visually using graphs and colors to depict the missing data, including presenting a specific color scheme to identify gaps in MAOP and MOP data.

The system can cause the processor to identify the gaps in MAOP data or MOP data using customized reports, standard reports, or other data reports that do not use visual indicators.

Turning now to the Figures, FIG. 1 depicts an overview of the computer processing equipment used for the system.

The system can include a first server 10 connected to a network 14.

The first server 10 can have a first processor 16 and a first data storage 18. The computer instructions, such as a computer program product 20a can operate the system and can reside totally in this first data storage 18 according to one or more embodiments.

In one or more embodiments, the data storage can be non-transitory computer-readable medium. The non-transitory computer-readable medium can be computer-readable media.

In one or more embodiments, a part of the system can include a cloud data storage 22.

In one or more embodiments, a computer program product 20b can operate the system and can partially reside within the cloud data storage 22. Additionally, the cloud data storage 22 can be connected to a cloud processor 24 in a computing cloud 26 that can communicate to the network 14.

In one or more embodiments, a second data storage 28 can be connected to a second processor 30 in a second server 31. A computer program product 20c can reside in the second data storage 28 and operate the system.

The second processor 30 can communicate via the network 14 and can connect to the computing cloud 26, as shown in this Figure.

Client devices 32a, 32b, and 32c can connect to the network 14 to receive the information from the system concerning gaps in MAOP and MOP pipeline information for fast action. Any number of client devices can be used.

Each client device is shown with a display 34a, 34b, and 34c. Executive dashboards 36a, 36b, and 36c can be created by the system and shown on the displays 34a, 34b, and 34c.

Users 38, 39, and 41 can all see the same information on the executive dashboards 36a, 36b, and 36c simultaneously, allowing for accelerated, fast action in potentially 2 percent to 25 percent less time concerning the identified gaps.

FIG. 2 is a diagram of the series of steps which the system can perform.

The system can perform the step of obtaining an identifier for a specific pipeline segment, as illustrated in box 200.

In an embodiment, the identifier is for at least one pipeline segment connected to a pipeline system controlled by a pipeline operator.

For example, the identifier can be a route identifier such as "LAL1064," the pipeline system can have a title such as "Nine Mile Lateral," and the pipeline operator can have a company name such as "Houston Gas Company."

The system can perform the step of collecting authenticated pipeline segment information, as illustrated in box 202.

The authenticated pipeline segment information can relate to the specific pipeline segment and can include physical pipeline attributes, pipeline locations, pipeline testing information, and pipeline age.

For example, authenticated pipeline segment information of physical pipeline attributes can include pipeline design information, such as a pipeline seam type, such as a double submerged arc welded pipe. A similar physical pipeline attribute can be pipeline yield strength of 35,000 PSIG for each segment of the pipeline.

The term "authenticated pipeline segment information" as used herein can refer to information which was obtained from engineers that designed the pipeline, contractors that constructed the pipeline, operators that operated or currently operate and maintain the pipeline, and other professionals, businesses, or governmental entities, that can verify the information is accurate and original.

The term "authenticated pipeline segment information" can also refer to original documents or copies of the original documents, and information contained on those original source documents or copies of those original source documents, which can be verified or authenticated as original, or as a copy of the original. Authenticated pipeline segment information can include original pipeline attributes from construction specifications, purchase orders, materials specification sheets or similar documents.

The system can perform the step of collecting non-authenticated pipeline segment information, as illustrated in box 204.

Collecting non-authenticated pipeline segment information can relate to collecting non-authenticated physical pipeline attributes, pipeline locations, pipeline testing information, and pipeline age, which relate to a specific identifier.

The term "non-authenticated pipeline segment information" can refer to information which is not from original documents and information and which is not from copies of original source documents. It can be information from an original source document, but the source of the original document is unknown or highly questionable, such as an unreliable construction document.

Non-authenticated pipeline segment information for pipeline physical attributes can include information that relates to the design, construction, operation and maintenance of the pipeline.

For example, non-authenticated pipeline segment information can be information transposed from an unknown document source into a spread sheet, such as an EXCEL™ spread sheet.

As another example, a piece of non-authenticated pipeline segment information can include information from a pipeline operator's Geographic Information System, such as information on pipeline wall thickness but the source of the wall thickness data is unknown.

The system can perform the step of performing dynamic segmentation by the processor, as illustrated in box 206.

In one or more embodiments, the processor can make a dynamic segmentation calculation for the pipeline segment associated with the identifier forming a first phase of the calculator data set.

Dynamic segmentation calculations are performed using multiple MAOP or multiple MOP data types associated with each pipeline segment.

Each data type has its own unique set of linear reference points which indicate changes to that data type along a pipeline segment from one end of the pipeline segment to the other end of the pipeline segment.

The system can perform the step of sorting the collected records of the dynamic segmented data set, as illustrated in box 207.

In one or more embodiments, the dynamically segmented data set can be sorted for duplicate information to de-activate the duplicate information, or sorted by date, so that older superseded information is de-activated.

The system can perform the step of performing a smart segmentation calculation on the dynamic segmented data set forming a calculator input set, as illustrated in box 208. Details of the smart segmentation calculation are shown in FIG. 4.

The system can perform the step of filling in the calculator input set forming a resulting calculator input set, as illustrated in box 210.

In one or more embodiments, the step can include identifying data gaps in the resulting calculator input set and filling in the gaps of the calculator input set forming a resulting calculator input set.

The system can compute gaps in MAOP or MOP data of the calculator input set and then fill those gaps with either (i) new authenticated information, new non-authenticated information, or combinations thereof, (ii) default values, or (iii) combinations thereof, wherein the default values are provided from one of a plurality of libraries.

If MAOP data or MOP data is missing or not collected, then default information is needed.

The system uses an algorithm to insert a default value when no value is provided from either the authenticated pipeline information or the non-authenticated pipeline information.

The default value can be obtained from one or more of a plurality of created libraries formed, populated and updated by an administrator. When the default information is automatically populated from the libraries by the system, the result is termed the resulting calculator input set.

The libraries that supply default values can include a library of expected physical pipeline attributes, a library of pipeline location information, and a library of testing information for pipelines.

The system can pull default information electronically from a plurality of libraries in the data storage.

The libraries can include a library of expected physical pipeline attributes that includes pipe yield, pipe thickness, pipe seam type, and pipe wall strength; a library of pipeline location information including addresses and lengths of pipelines; a library of testing information for pipelines including pressure test results and material test results.

The system can use the resulting calculator input set for calculating record by record MAOP or MOP forming an MAOP or MOP output set, as illustrated in box 212.

The step for calculating the MAOP or MOP can be performed using a calculation according to the federal rules for MAOP or MOP as found in 49 CFR part 192 and 195, effective in 2012 to take the lowest of the following: (i) design pressure calculations; (ii) hydrostatic test calculations; (iii) highest actual operating pressure preceding an applicable regulatory date found in 49 CFR part 192 or in a similar applicable state regulatory requirement; or (iv) operator determined MAOP resulting in a numeric MAOP value or numerical MOP value for each record of the resulting calculator input set.

The system can perform the step of displaying valid and invalid MAOP or MOP calculations on an executive dashboard, as illustrated in box 214. The executive dashboard can be viewable continuously by multiple users from a plurality of client devices simultaneously, wherein the processor updates the executive dashboard continuously for the users.

The system can present both (i) a graphic depiction of valid and invalid MAOP calculations or MOP calculations and (ii) a listing of valid and invalid MAOP calculations or MOP calculations using the executive dashboard viewable 24 hours a day, 7 days a week from a plurality of client devices simultaneously via a network.

The invalid MAOP calculations are presented as a value less than an established MAOP or MOP and the valid MAOP or MOP calculations are presented as a value equal to or greater than an established MAOP or MOP calculation.

For example, the system can cause the executive dashboard to be updated each time a new pipeline segment with an identifier is viewed.

As another example, the system can cause the executive dashboard to be updated each time a MAOP or MOP calculation is performed.

The system can identify the gaps in MAOP data or MOP data graphically using graphs and colors to depict the missing data including a specific color scheme to identify gaps.

The gaps in MAOP data or MOP data can be inserted into customized reports, standard reports, or other data reports that do not use visual indicators.

The system can perform the step of depicting a linear referenced profile on the executive dashboard, as illustrated in box 215.

The term "linear referenced profile" can refer to a presentation that shows MAOP or MOP calculations in a line going across a graph that depicts the values across the range of a pipeline segment.

The executive dashboard can show a linear referenced profile to enable viewing of the quality of the data used to calculate the MAOP or MOP value.

The system can perform the step of creating multiple user accounts per pipeline operator, as illustrated in box 220.

The system can perform the step of using multiple formats of authenticated and non-authenticated data with each collecting step of authenticated and non-authenticated data, as illustrated in box 222.

The system can perform the step of using an encryption module controlling access to the MAOP or MOP output set, as illustrated in box 224.

The system can perform the step of maintaining the pipeline information in a cloud based server, as illustrated in box 226.

The system can perform the step of creating an auditable trace between authenticated MAOP or MOP input data and the source documents using a unique identifier, as illustrated in box 228. An example of a unique identifier can be a bar code.

The system can perform the step of providing government regulatory citations that were used to form the MAOP or MOP output set, as illustrated in box 230. In one or more embodiments, the government regulatory citations can be state, federal, county, municipal, or combinations thereof.

The system can perform the step of providing a report or alarm to a user when a major discrepancy with MAOP or MOP output set compared to a pipeline operator established MAOP or MOP exists, as illustrated in box 232.

The system can perform the step of providing the MAOP or MOP output set to the executive dashboard to determine if a pipeline is capable of a higher operating pressure rating than has currently been established, as illustrated in box 234.

FIG. 3 shows the steps that the system uses to perform a dynamic segmentation calculation.

The system can perform the step of grouping pipeline information forming grouped data, as illustrated in box 300.

For example, all of the data for an identifier can be grouped by data type.

For example, one of the data types can be pipe components and an associated identifier can be "LAL0014".

The system can perform the step of assigning a linear range to grouped data, as illustrated in box 302.

The linear range can be formed when the grouped data is associated with distinct physical locations along the pipeline segment. The linear range can have a start point and an end point.

The system can perform the step of identifying data change in grouped data within the linear range, as illustrated in box 304.

The term "data change" as used herein can refer to a change in data within a data type.

The system can perform the step of forming a distinct MAOP or MOP record containing all of the grouped data with identified data change in order to run an MAOP calculation or an MOP calculation, this MAOP or MOP record is termed "the dynamically segmented data set", as illustrated in box 306.

FIG. 4 depicts the steps of performing a smart segmentation calculation by the system.

A calculator input set is computed from the dynamically segmented data set.

A step of the smart segmentation calculation can include selecting the most recent data 400 from the dynamically segmented pipeline information.

The system uses an algorithm to analyze MAOP or MOP records of the first phase calculator data set for identical data types and then select the most recent date, that is, for identical data types with multiple dates, the MAOP or MOP data with the most recent date is selected.

A step of the smart segmentation calculation can include selecting the highest quality data 402 from the most recent data.

The system uses another algorithm to prioritize the MAOP or MOP records for the highest quality data from identical data types and then select the data type of the identical data types with the highest quality forming a calculator input set.

The term "highest quality" as used herein can refer to pipeline data that meets predefined criteria based on a series of criteria, but can also include sources of documents, types of documents, original information, signed and dated documents or transposed original verified information forming a calculator input set.

Figure 5B:
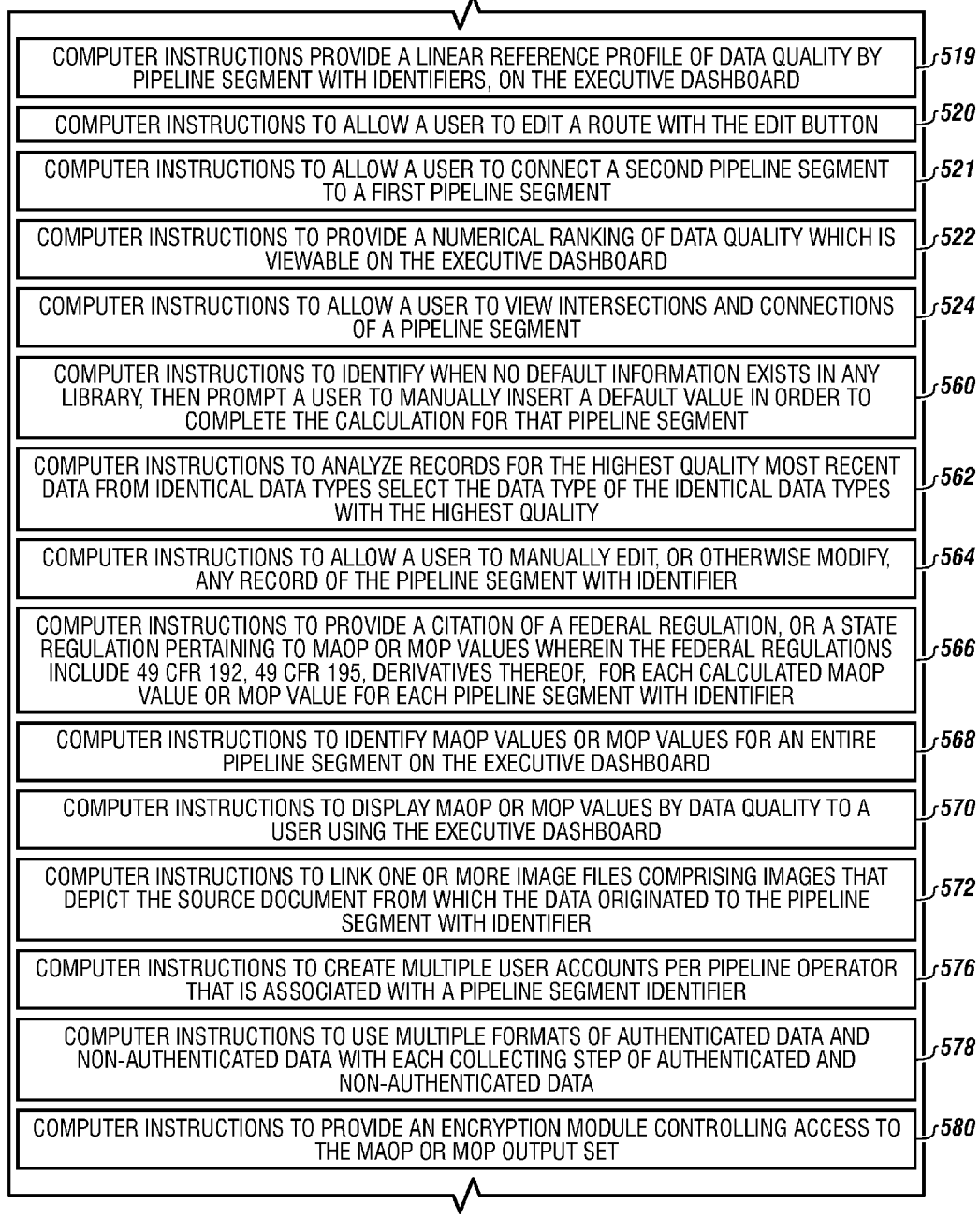
Figure 5C:
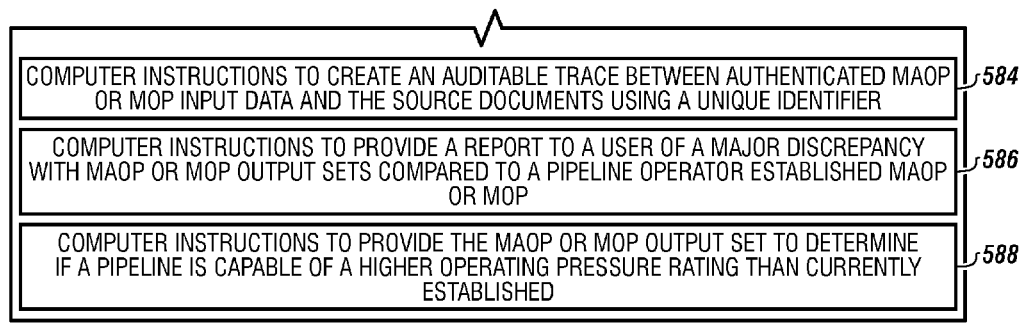

FIGS. 5A-5C show the plurality of computer instructions in the data storage according to one or more embodiments.

The data storage 18 can include computer instructions 500 to pull data from many different data sets for analysis and obtain an identifier for a specific pipeline segment.

The data storage 18 can include computer instructions 502 to collect authenticated pipeline segment information related to the pipeline segment with the identifier.

The data storage 18 can include computer instructions 503 to collect non-authenticated pipeline segment information for the pipeline segment with the identifier.

Each record of the data set contains information from records that can have multiple sets of the same type of data.

All or a portion of these data sets are then used to perform a series of computations that result in a dynamically segmented pipeline data set.

For example, some of the records might have pipeline material used in 1965 and then pipeline material that was changed out in 1990 for the same pipeline segment.

The data storage 18 can include computer instructions 504 to perform a dynamic segmentation calculation which categorizes the collected information into at least a portion of the plurality of data sets and form a first phase calculator data set.

The data storage 18 can include computer instructions 505 to perform a smart segmentation calculation on the first phase calculator data set forming a calculator input set.

These computer instructions can initiate the calculation by grouping information that has been categorized forming grouped data of the calculator input set.

These computer instructions can assign a linear range to grouped data of the calculator input set, wherein each linear range has a start point and an end point.

The data storage 18 can include computer instructions 506 to identify data change in grouped data within the linear range.

The data storage 18 can include computer instructions 507 to form a MAOP or MOP record containing all of the grouped data with identified data changes in order to run a MAOP calculation or a MOP calculation.

This formed MAOP or MOP record is termed herein as "the dynamically segmented data set."

The data storage 18 can include computer instructions 508 to sort the collected information of the pipeline data sets for duplicates or older superseded information and then de-activate the older information or duplicates.

The data storage 18 can include computer instructions 509 to perform smart segmentation on the dynamic segmented data set forming a calculator input set.

The data storage 18 can include computer instructions 510 to use an algorithm to analyze MAOP or MOP records of the first phase calculator data set for identical data types and select the data type by a most recent date.

The data storage 18 can include computer instructions 512 to use an algorithm to prioritize the MAOP or MOP records for the highest quality data from identical data types and then select the data type of the identical data types with the highest quality.

The data storage 18 can include computer instructions 514 to use an algorithm to insert default information for missing data into the calculator input set to complete the set of required data for pipelines forming a resulting calculator input set.

The algorithm pulls default information from the aforementioned plurality of libraries in the data storage, including but not limited to: a library of pipeline location information, a library of pipeline testing information and a library of pipeline attributes.

In an embodiment, the plurality of libraries can be formed, populated and updated by the administrator of the computer instructions to perform the steps of the system or the method.

The libraries can provide default information related to the default value, such as source of the value, similar values for similar by not identically sized pipelines.

One of the libraries used to provide default values can be a library of expected physical pipeline attributes that includes pipe yield, pipe thickness, pipe seam type, and pipe wall strength. Another of the libraries used to providing default values can be a library of pipeline location information. The library can include addresses and lengths of pipelines.

Still another library used to providing default values is a library of testing information for pipeline.

The data storage 18 can include computer instructions 516 to calculate record by record MAOP or MOP values using the resulting calculator input set forming an MAOP output set or an MOP output set.

The data storage 18 can include computer instructions 517 to show valid and invalid MAOP or MOP calculations on an executive dashboard viewable continuously by users and updated continuously over a network, a computing cloud, or combinations thereof.

The data storage 18 can include computer instructions 518 to update the executive dashboard each time a new pipeline segment with an identifier is viewed.

The data storage 18 can include computer instructions 519 to provide a linear reference profile of data quality by pipeline segment with identifiers, on the executive dashboard.

The data storage 18 can include computer instructions 520 to allow a user to edit a route with the edit button.

The data storage 18 can include computer instructions 521 to allow a user to connect a second pipeline segment to a first pipeline segment.

The data storage 18 can include computer instructions to 522 provide a numerical ranking of data quality which is viewable on the executive dashboard.

The data storage 18 can include computer instructions 524 to allow a user to view intersections and connections of a pipeline segment.

The intersections and connections can include types of joints used to connect two different pipeline segments.

The data storage 18 can include computer instructions 560 to identify when no default information exists in any library, then prompts a user to manually insert a default value in order to complete the calculation for that pipeline segment.

The data storage 18 can include computer instructions 562 to analyze records for the highest quality most recent data from identical data types and select the data type of the identical data types with the highest quality.

The term "highest quality most recent data" as used herein can refer to pipeline data that meets a predefined criteria based on a series of criteria that may be user defined, but include source of document, type of document, original information, signed and dated document or transposed information forming a calculator input set.

The data storage 18 can include computer instructions 564 to allow a user to manually edit, or otherwise modify, any record of the pipeline segment with identifier.

In one or more embodiments, the user can edit all or a portion of a pipeline, deleting a pipeline segment, or adding a pipeline segment.

The data storage 18 can include computer instructions 566 to provide a citation of a federal regulation, or a state regulation pertaining to MAOP or MOP values wherein the federal regulations include 49 CFR 192, 49 CFR 195, derivatives thereof, for each calculated MAOP value or MOP value for each pipeline segment with identifier.

The data storage 18 can include computer instructions to 568 identify MAOP values or MOP values for an entire pipeline segment on an executive dashboard.

The data storage 18 can include computer instructions to 570 display MAOP or MOP values by data quality to a user using the executive dashboard.

The term "data quality" can refer to the quality of MAOP or MOP values that meet a predefined acceptability level based on user defined criteria, such as source of data or complimentary source of data. A complimentary source of data can be a second source of a single data point in the MAOP or MOP calculation. For example, pipeline wall thickness can come from a requisition order for pipeline materials as well as from a complimentary source, which can be a pre-construction alignment sheet.

The displayed MAOP values or displayed MOP values can be referred to herein as "a results/output set."

The results/output set can be used for preparing additional SQL server reports such as reports for DOT PHMSA compliance. DOT stands for Department of Transportation and PHMSA stands for Pipeline and Hazardous Materials Safety Administration.

It should be noted that the results/output set can be used for updating one or more of the libraries for the pipeline, such as a pipeline operator's own GIS system.

The data storage 18 can include computer instructions 572 to link one or more image files comprising images that depict the source document from which the data originated to the pipeline segment with identifier.

The data storage can include computer instructions to enable omission of any one piece of data before MAOP or MOP calculation is performed.

The data storage 18 can include computer instructions 576 to create multiple user accounts per pipeline operator that is associated with a pipeline segment identifier.

The data storage 18 can include computer instructions 578 to use multiple formats of authenticated data and non-authenticated data with each collecting step of authenticated and non-authenticated data.

The data storage 18 can include computer instructions 580 to provide an encryption module controlling access to the MAOP or MOP output set.

In one or more embodiments, the data storage can contain computer instructions to maintain the pipeline information in a cloud based server.

The data storage 18 can include computer instructions to create an auditable trace between authenticated MAOP or MOP input data and the source documents using a unique identifier 584.

The data storage 18 can include computer instructions 586 to provide a report to a user of a major discrepancy with MAOP or MOP output sets compared to a pipeline operator established MAOP or MOP.

The data storage 18 can include computer instructions 588 to provide the MAOP or MOP output set to determine if a pipeline is capable of a higher operating pressure rating than currently established.

Figure 6:
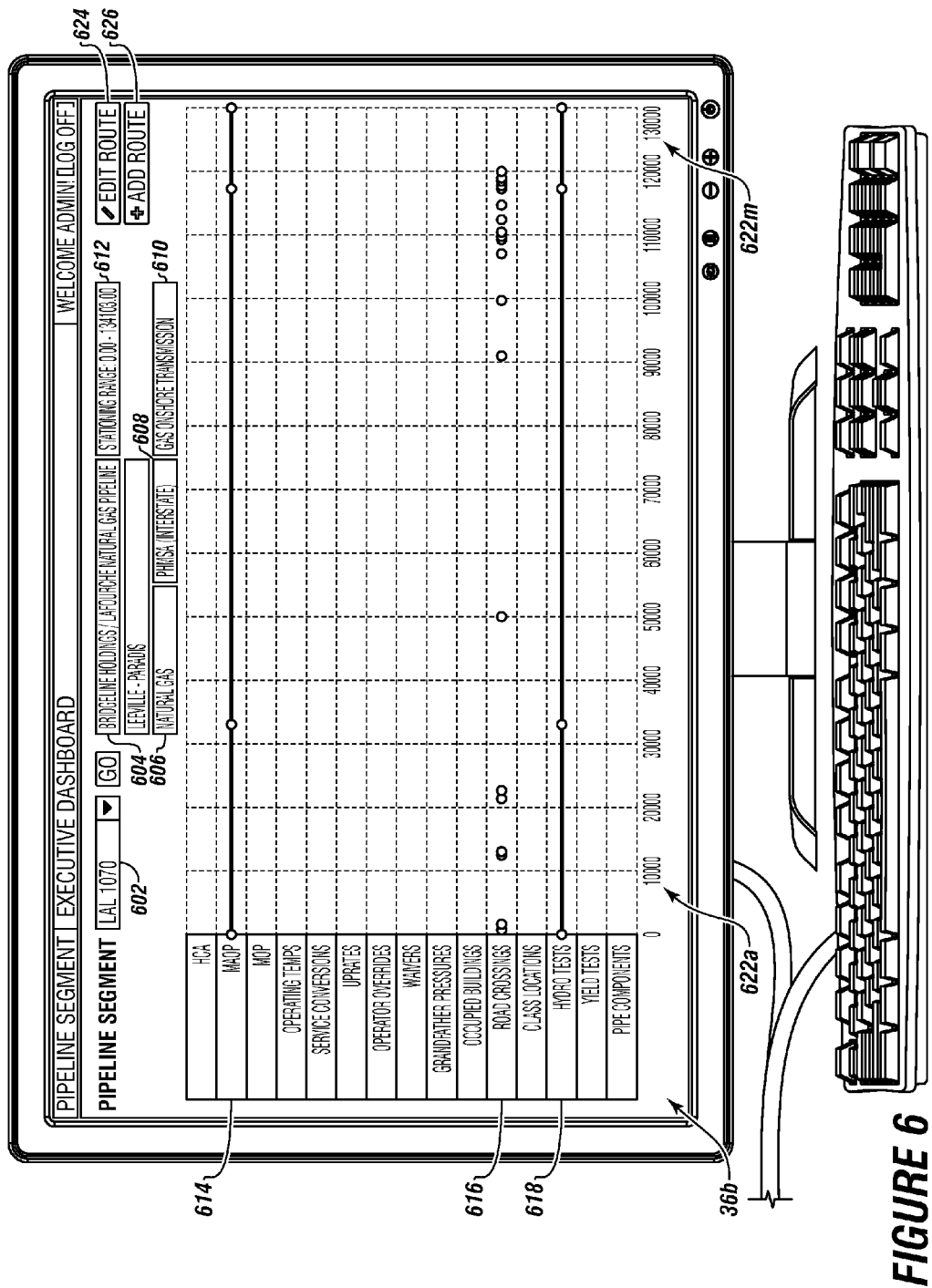
FIG. 6 is an example of a screen shot from the executive dashboard according to one or more embodiments.

FIG. 6 shows a display of an executive dashboard created by the system.

The executive dashboard 36b depicts an identifier 602 for a specific pipeline segment as LAL1070 for a named pipeline 604, the Lafourche Natural Gas Pipeline.

On the executive dashboard 36b can also be other information including type of pipeline 606, "natural gas", jurisdiction of pipeline 608, such as "interstate"; transmission type 610 such as "gas onshore transmission," and stationing range 612, shown in this example as 0.00-134103.00.

FIG. 6 also shows the type of data for this pipeline as MAOP identified as element 614.

The executive dashboard 36b can include information on the location of the pipeline relative to road crossings 616.

The executive dashboard information can include information on pipeline testing information shown as hydro test information 618.

This pipeline is shown having dynamic segments 622a to 622m.

Pipeline dynamic segment 622a for the hydro test 618 has behind it or linked to it a display of the gaps of the MAOP data. Dynamic segment 622a indicates the 10,000 dynamic segment and 622m indicates the 130,000 dynamic segment.

The executive dashboard 36b shows edit button 624. Edit button 624 can connect to computer instructions in the data storage to allow a user to edit a route with the edit button.

The executive dashboard shows an add route button 626.

The add route button 626 can connect to the computer instructions in the data storage to allow a user to connect a second pipeline segment to a first pipeline segment.

The executive dashboard allows a user to view intersections of two different, but connected pipelines while viewing an added pipeline by connecting to the computer instructions to view connections.

FIG. 7 depicts a display of a plurality of pipeline segment information data sets usable with this system.

This Figure further depicts categories of data sets used to compute gaps in the MAOP or MOP. Some of the approximately fifty two different data sets can be related to physical attributes of the pipeline, testing of the pipeline and the physical location of the pipeline.

The data sets can be used to form a first phase calculator data set.

Some the data sets categories are: line location/stationing 700, class location 702, converted or uprated 704, occupied building within 300 feet 706, maximum operating temperature 708, highest documented test or operating pressure including a five year code grandfather period 710, hydrostatic tests 712, pipe information 714, repair sleeves information 716, established MAOP according to 49 CFR part 192.611(B) and part 192.555(B) 718; Maximum Operating Pressure (MOP) 720; and operator Determined MAOP override 722.

Each of these data sets can have various additional data fields. For example, the pipe information 714 can contain, but is not limited to, date installed 780, date of manufacture 781, road crossings 782, fabricated assembly 783, compression regulation, measuring station 784, is pipe cold expanded and re-heated? 785, material 786, outer diameter (O.D) 787, wall thickness (W.T.) 788, seam type 789, and grade 790.

For example, some of the physical attributes can be wall thickness, seam type, yield strength, outside diameter of the pipeline, and material type of the pipeline such as plastic or steel.

Some of the plurality of different data sets can relate to the physical location information can include such as, a longitude and latitude of a road crossing and/or a railroad crossing, class location information which indicates the proximity and density of population to the pipeline including people and buildings.

Age of construction of the pipeline can be one of the many different data sets used in this system.

The data sets can include pressure testing information on the pipeline and may include information on dates of pressure tests, pressures of pressure test, durations of pressure tests, and types of pressure test (whether the pressure test uses water, insert gas, or another gas or liquid). It should be noted that an elevation profile of the pipeline being tested may be one of these data sets.

While these embodiments have been described with emphasis on the embodiments, it should be understood that within the scope of the appended claims, the embodiments might be practiced other than as specifically described herein.

What is claimed is:

1. A system for providing traceable, verifiable and complete Maximum Allowable Operating Pressure (MAOP) or Maximum Operating Pressure (MOP) information for a specific pipeline to users in an automated manner that is viewable continuously via a network from a plurality of client devices, wherein the system comprises:
   a. a processor in communication with a network; and
   b. a data storage in communication with the processor, wherein the data storage implements a series of steps using:
      (i) computer instructions to obtain an identifier for a specific pipeline segment from a list of titles or company names controlled by a pipeline operator;
      (ii) computer instructions to collect authenticated pipeline segment information for the specific pipeline segment associated with the identifier, wherein the authenticated pipeline segment information comprises physical pipeline attributes that are verified or authenticated as original or as a copy of the original and includes original pipeline attributes from construction specifications, purchase orders, materials specification sheets or similar documents originating from engineers that designed the pipeline, contractors that constructed the pipeline, and operators that operated or currently operate and maintain the pipeline, each of which verifies that the information is accurate and original;
      (iii) computer instructions to collect non-authenticated pipeline segment information related to the pipeline segment with the identifier comprising: and maintenance of a pipeline, pipeline locations, pipeline testing information, and pipeline age, which relate to the identifier, wherein the non-authenticated pipeline segment information is not from original documents and is not from copies of source documents and can include documents with an unknown source;
      (iv) computer instructions to perform dynamic segmentation to categorize the collected information forming a first phase calculator data set wherein performing dynamic segmentation comprises:
         1. grouping pipeline information by data type, each data type having a unique set of linear reference points that indicate changes to the data type along a pipeline segment forming grouped data;
         2. identifying data change within a linear range in the grouped data using a start point and an end point; and
         3. forming a dynamically segmented data set comprising a distinct MAOP or MOP record containing grouped data with identified data changes to run an MAOP calculation or an MOP calculation;
      (v) computer instructions to perform smart segmentation on the first phase calculator data set forming a calculator input set by:
         1. selecting the most recent data from the dynamically segmented data set;
         2. grouping the first phase calculator data set forming grouped data with a linear range; and
         3. using an algorithm to analyze MAOP or MOP records of the first phase calculator data set for identical data types then select the most recent date for identical data types with multiple dates, in the linear range;
      (vi) computer instructions to insert default information for missing data into the calculator input set to form a resulting calculator input set using the library of expected physical pipeline attributes, wherein the physical pipeline attributes comprise pipe yield, pipe thickness, pipe seam type, and pipe wall strength; a library of pipeline location information wherein the library of pipeline location information comprises addresses and lengths; and a library of testing information wherein the library of testing information comprises pressure test results and material test results, or combinations thereof;
      (vii) computer instructions to calculate record by record MAOP or MOP on the resulting calculator input set forming a MAOP or MOP output set;
      (viii) computer instructions to (i) graphically depict valid and invalid MAOP calculations or MOP calculations, (ii) provide a listing of valid and invalid MAOP calculations or MOP calculations using an executive dashboard viewable 24 hours a day, 7 days a week from a plurality of client devices simultaneously via a network;

(ix) computer instructions to provide a linear reference profile of data quality by pipeline segment with identifiers on the executive dashboard wherein the linear reference profile is a presentation that shows MAOP or MOP calculations in a line going across a graph that depicts the value across the range of a pipeline segment; and (x) computer instructions to show valid and invalid MAOP to a user using an executive dashboard viewable 24 hours a day, 7 days a week via a network for continuous updating wherein the valid and invalid MAOP meet a predefined acceptability level based on user defined criteria.

2. The system of claim 1, wherein the data storage is connected with a first server in communication with the network.

3. The system of claim 1, wherein the data storage comprises a plurality of data storages.

4. The system of claim 3, wherein the plurality of data storages includes a cloud data storage.

5. The system of claim 4, wherein a portion of the computer instructions is stored on one of the data storages of the plurality of data storages, and another portion of the computer instructions is stored on the cloud data storage.

6. The system of claim 1, wherein the data storage comprises computer instructions to update the executive dashboard each time a new pipeline segment with an identifier is viewed.

7. The system of claim 1, wherein the data storage comprises computer instructions to provide a numerical ranking of data quality on the executive dashboard.

8. The system of claim 1, wherein the data storage comprises computer instructions enabling editing of all or a portion of a pipeline, deleting a segment, or adding a segment.

9. The system of claim 1, wherein the data storage comprises computer instructions to portray intersections and connections, including types of joints used to connect two different pipelines.

10. The system of claim 1, wherein the data storage comprises computer to identify when no default information exists in any library, then prompt a user to manually insert a default value in order to complete the calculation for that pipeline segment.

11. The system of claim 10, wherein the user is a computer.

12. The system of claim 1, wherein the data storage comprises computer instructions to analyze records for the highest quality most recent data from identical data types, select the data type of the identical data types with the highest quality.

13. The system of claim 1, wherein the data storage comprises computer instructions to provide a citation of a federal regulation or a state regulation pertaining to MAOP or MOP for each calculated MAOP value or MOP value for each pipeline segment.

14. The system of claim 1, wherein the data storage comprises computer instructions to identify MAOP values or MOP values for an entire pipeline segment on an executive dashboard.

15. The system of claim 1, wherein the data storage comprises computer instructions to link elements on the executive dashboard to (i) one or more image files, (ii) to images that depict the source document from which the data originated or combinations thereof.

16. The system of claim 1, wherein the data storage comprises computer instructions to provide an encryption module controlling access to the MAOP or MOP output set.

* * * * *